United States Patent [19]

Desai et al.

[11] Patent Number: 5,539,552
[45] Date of Patent: Jul. 23, 1996

[54] PROTECTIVE MEMBER FOR DISPLAY SYSTEM HAVING 99 UV LIGHT BLOCKING ABILITY AND IMPROVED THERMAL COEFFICIENT OF EXPANSION

[75] Inventors: Bhupendrarai C. Desai, North Wales; John Doyle, Westchester; Michael J. Giuglianotti, Telford, all of Pa.

[73] Assignee: Aerospace Display Systems, Hatfield, Pa.

[21] Appl. No.: 426,170

[22] Filed: Apr. 20, 1995

[51] Int. Cl.⁶ .............. G02F 1/1335; G02F 1/1333; G02F 1/133; G02F 1/13
[52] U.S. Cl. .............. 359/66; 359/67; 359/86; 359/43; 359/83
[58] Field of Search .............. 359/66, 67, 86, 359/43, 83

[56] References Cited

U.S. PATENT DOCUMENTS

| | | | |
|---|---|---|---|
| 4,946,827 | 8/1990 | Harrison et al. | 503/227 |
| 4,988,168 | 1/1991 | Dickerson et al. | 350/339 |
| 5,016,985 | 5/1991 | Kalmanash et al. | 350/335 |
| 5,032,007 | 7/1991 | Silverstein et al. | 359/53 |
| 5,032,828 | 7/1991 | Hirose et al. | 340/702 |
| 5,039,204 | 8/1991 | Choi | 359/67 |
| 5,096,520 | 3/1992 | Faris | 156/99 |
| 5,122,891 | 6/1992 | Kim | 359/67 |
| 5,247,374 | 9/1993 | Terada | 359/86 |
| 5,281,562 | 1/1994 | Araujo et al. | 501/32 |
| 5,317,431 | 5/1994 | Yoshida et al. | 359/51 |
| 5,321,539 | 6/1994 | Hirabayashi et al. | 359/94 |
| 5,468,064 | 11/1995 | Lengyel et al. | 359/63 |

Primary Examiner—Anita Pellman Gross
Assistant Examiner—Fetsum Abraham
Attorney, Agent, or Firm—Daniel J. Bourque; Kevin J. Carroll

[57] ABSTRACT

A protective member for a display device such as an LCD display mounted in a display system provides protection to the display device against ultraviolet light and shock. In one embodiment, the protective member is mounted between the display device and at least one source of light energy which includes both ultraviolet light energy and visible light energy. In another embodiment, the protective member is used to actually fabricate the display device. The protective member blocks generally all of the ultraviolet light energy which has a wavelength of between 200 to 390 nanometers, while transmitting at least 90 percent of the visible light energy having a wavelength greater than approximately 410 nanometers. The protective member has a thermal coefficient of expansion (TCE) of between $45 \times 10^{-7}/°$ C. and $60 \times 10^{-7}/°$ C., so as to be useable with present day manufacturing processes for such display devices.

21 Claims, 1 Drawing Sheet

PROTECTIVE MEMBER FOR DISPLAY SYSTEM HAVING 99% UV LIGHT BLOCKING ABILITY AND IMPROVED THERMAL COEFFICIENT OF EXPANSION

FIELD OF THE INVENTION

This invention relates to display systems and more particularly, to a highly transparent, ultraviolet light filtering protective member which is placed in close proximity to a display device, such as a liquid crystal display, for protecting the display from one or more elements such as ultraviolet energy and shock impacts.

BACKGROUND OF THE INVENTION

Display devices, such as liquid crystal displays (LCD's), twisted nematic (TN) have recently come into extensive use in display systems used on various types of products ranging from computers to military equipment including displays in airplanes, tanks and vehicles and military hardware. These displays have come to wide spread usage due to their low maintenance requirements, and generally high reliability. More specifically, their wide spread use in military applications has come about due to the standardization and reliability of manufacturing techniques used to manufacture such displays.

Although liquid crystal and other types of displays have been in use for a number of years now, problems are now beginning to show up due to various usage conditions, and the length of time that the displays have been in use.

For example, it has recently been discovered that some liquid crystal displays can exhibit voids or "white spots" in the liquid crystal material after being subject to certain combinations of environmental extremes. In addition, some displays which are formed by two plates of glass or other similar material bonded together and sealed to enclose the liquid crystal material have exhibited failures in the seal itself. Careful investigation by the present inventors has lead to the discovery that such failures are due to ultraviolet light energy affecting the liquid crystal material, the seal, and thin films in the display. In addition, further investigation has disclosed that shock, either an immediate impact on the display, thermal, or a more remote vibrational type shock in the vehicle or hardware to which the display is mounted can also cause such results.

It was well known in the prior art to attempt to protect the displays from ultraviolet light sources. It was believed that ultraviolet light will damage the displays, over time, however no concrete data on the extent and manifestation of the problem was available. It was believed, from various test results, that prior art display systems would exhibit some degradation after 20 to 25 hours of exposure to ultraviolet light energy.

Accordingly, some prior art display systems attempted to solve the anticipated problems of exposure to ultraviolet radiation by providing ultraviolet coatings or filters in conjunction with the display system. These solutions were not adequate, however, for several reasons. First, although some of the prior art coatings and filters promised a high absorption of ultraviolet energy under 400 nanometers and a high transmission of visible energy over 400 nanometers, most coatings and filters actually exhibited a cut off in absorption at approximately 375 nanometers. Accordingly, ultraviolet energy in the range of 375 to 400 nanometers was not filtered or absorbed and thus, caused degradation, over time, with the display system.

Secondly, other coatings or filters absorbed and filtered the visible spectrum of light up to approximately 410 nanometers or higher. This caused a sharp loss of color in the display system, along with the problem of light reflecting off the display system.

Thirdly, thin film ultra-violet (UV) coatings affect other depositions and processes such as High Efficiency Anti-Reflective coatings that are also very angular dependent, and pass increased UV doses depending on the incident angle An additional method which was utilized in the prior art was to provide plastic or acrylic display covers or display elements. The problem with plastic or acrylic displays is that they cannot be used with the present manufacturing procedures which require high temperatures to bond various elements together. In addition, plastics and acrylics are highly susceptible to scratching even with hardcoatings.

A further problem which is present in both filter or coating prior art methodologies and the acrylic or plastic display methodologies are that some elements used to provide ultraviolet filtering flouresce or shine at night when stimulated with various shorter wavelengths. According to military specification MIL 85762A, also commonly referred to as NVIS (night vision imaging system) specifications, the chemical composition of any coatings, filters or other elements destined for military applications cannot shine or "fluoresce" at night. This makes the military NVIS hardware useless, potentially rendering a pilot or driver "blind" while using NVIS equipment.

An additional problem with the plastic and acrylic materials are that these materials tend to change color or yellow over time.

Many of the problems with the prior art and present day display systems were recently manifested in the extreme environmental conditions which were present during recent Military operations commonly referred to as Operation Desert Storm in the Middle East. The cockpits of airplanes and other military hardware were exposed to extremes of environmental conditions including light, temperature, and thermal and mechanical shock.

Aircraft and tanks, for example, have a high vibration profile. In addition, usage of these displays in military applications during operational readiness, often makes the display susceptible to impact and shocks from other military hardware, including seat belts, etc.

In yet another attempt at providing ultraviolet light protection from display systems, some prior art methods could include providing an ultraviolet coating on the cockpit windows of airplanes or other large glass areas on military hardware. Again, the same problems expressed earlier apply to such large areas of glass or plastic and are aircraft type dependent.

Although there have been some discussions in the past with utilizing ultraviolet light absorbing glass and the manufacturing of display systems, those glasses have generally not been usable for a number of reasons. For example, glass that has a high alkaline content such as standard soda lime glass must generally be passivated before it can be used in the manufacture of liquid Crystal displays in order to prevent some of the ions from leaching out and having an affect and reacting with some of the elements and coating used to manufacture displays. Additionally, some glass or glass type materials are not compatible with present day manufacturing and display processing techniques due to various reasons such as lack of high temperature capabilities.

Accordingly, what is needed is a glass type material which can be used in conjunction with present day manufacturing and display system processing techniques which utilize high temperatures and require a glass of relatively low alkalinity. Most importantly, what is needed is a glass with a high ultraviolet light blocking ability up to and including approximately 400 +/−10 nanometers from light incident at an angle without affecting the amount of blocked UV light, but with a very sharp cut off of absorption at and above 400 nanometers, to allow essentially all of the visible light to be transmitted above 400 nanometers. Additionally, such glass or glass like element must have an ion and elemental content which does not fluoresce under NVIS conditions, and which has a thermal co-efficient of expansion (TCE) which closely matches that of other elements used in the display manufacturing process.

SUMMARY OF THE INVENTION

The present invention features a protective member for use with a display device or member in a display system. The protective member is disposed at least proximate the display device, between the display device and a source of light energy. The light energy includes both ultraviolet light energy and visible light energy.

The protective member absorbs generally all of the ultraviolet light energy with a light energy wavelength of less than 400 nanometers, yet transmits at least 90 percent of the visible light energy having a light energy wavelength greater than 400 nanometers. This protective member further includes alkalinity level and a thermal coefficient of expansion (TCE) between $45 \times 10^{-7}/°$ C. and $60 \times 10^{-7}/°$ C. A lower alkalinity level in the protective member allows the protective member of the present invention to be used with existing display system manufacturing processes without the need for expensive and time consuming passivation except where the display manufacturing process requires it. Most importantly, the controlled and narrow thermal coefficient expansion of the protective member allows the protective member to be used with existing technology without fear that one part of the system will expand and contract more or less than other parts, and without having to build the entire display from an expensive glass type in order to match the thermal coefficient of expansion of all of the glass pieces.

In the preferred embodiment, the protective member of the present invention further does not include anything that would fluoresce and meets or exceeds military specification MIL 85762A as to fluorescence.

In one embodiment, the light source may be provided in front of the display system while in another embodiment, the light source may be behind or in back of the display system. In yet another embodiment, two light sources may be provided, one in front and in back of the display system.

An exemplary display member or device which is used with the protective member of the present invention includes both a front and back glass member. In one embodiment, the protective member of the present invention may be bonded to the front, back or both front and back glass members of the display device. In another embodiment, the protective member of the present invention may be placed in close proximity to the front and/or back glass members of the display device. In yet another embodiment, the protective member of the present invention may be used to actually form the front and/or back glass members of the display device. In such cases, no additional filters or protective members are necessary to provide the sought after protection against ultraviolet light, shock, fluorescence, etc.

The protective member of the present invention is particularly well suited for use with electronically activated display devices such as liquid crystal display (LCD) display devices and any other display devices that can suffer from UV degradation. In addition to ultraviolet light protection, the protective member of the present invention also protects the display device from thermal and vibrational shock.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
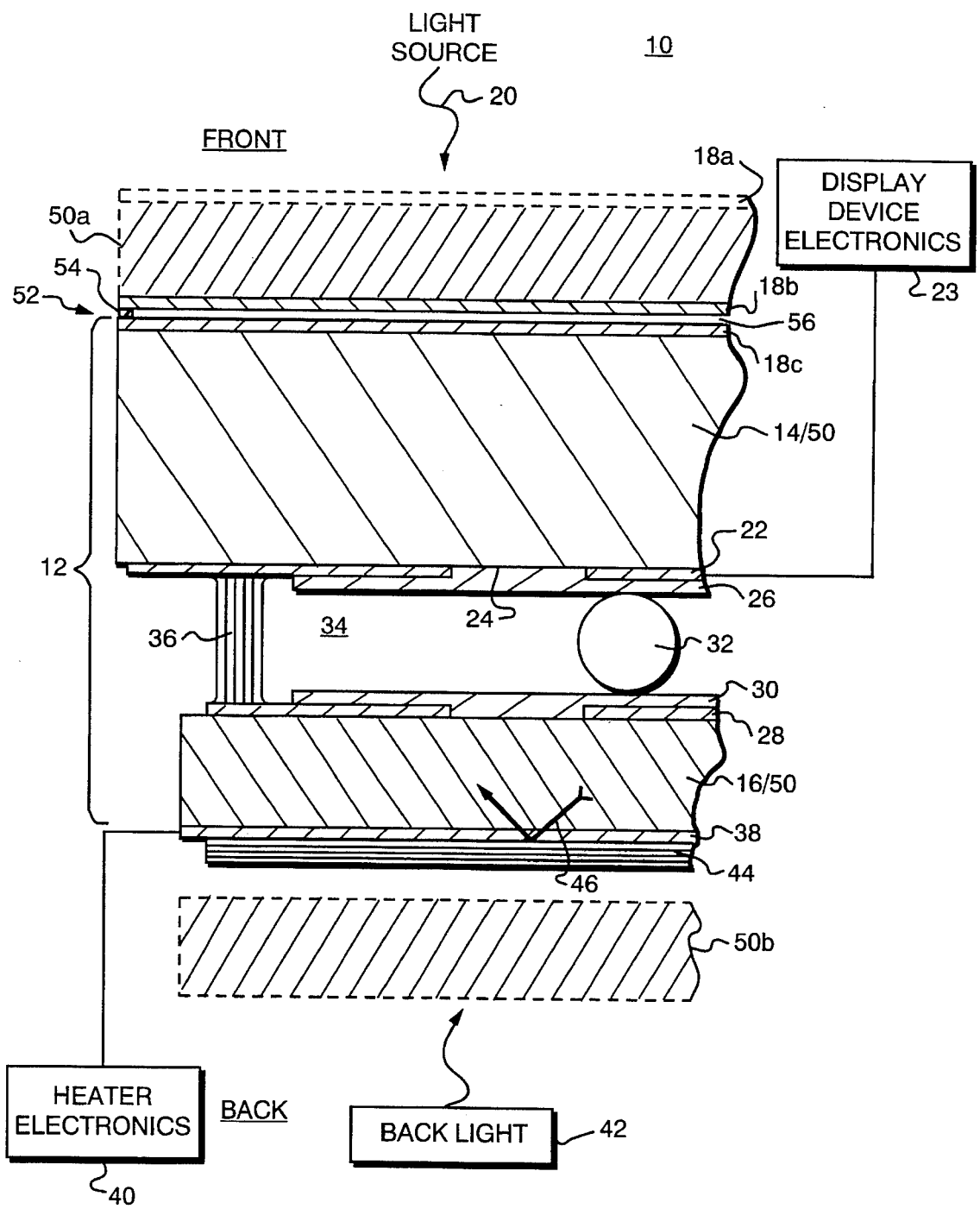
FIG. 1 is a schematic cross-sectional diagram of a display member including the protective member according to the present invention.

The present invention features a protective member for use with a display system 10, FIG. 1. Those skilled in the art are well acquainted with prior art display members or devices 12 typically comprising a front member 14 and a rear member 16. In the prior art devices, the front member 14 may further include an anti-reflective coating 18 along the front surface, facing a first light source 20. The front of the display device is so named when viewed from the user or viewer's point of reference. Accordingly, the first source of light 20 is typically ambient sunlight.

A typical display member or device 12 further includes one or more segment patterns 22 which are applied to the inner surface 24 of the front member 14. The display segment region or pattern 22 is connected to display device electronics 23 which control energizing and de-energizing the segment pattern with a resulting energizing or de-energizing of the display device. Covering the one or more segment patterns 22 is typically a polyimid alignment layer 26 which helps protect the segment pattern layer 22.

The rear member 16 also typically includes an applied common pattern region 28 which serves as a common electrical connection for the display device being formed. The common pattern 28 is also typically covered and protected by a polyimid alignment layer 30. One or more spacers 32 formed of glass, plastic or other materials or techniques including epoxy dots and polyimide keeps the first and second members 14, 16 in precise spaced relationship.

Although there are various manufacturing techniques, one common technique of manufacturing displays, such as liquid crystal displays, includes manufacturing multiple displays on a sheet of glass, assembling the sheets, and filling the voids 34 formed between the front and rear glass members 14, 16 with liquid crystals after the front and rear glass members are assembled. In accordance with this technique, a seal 36 is applied around the periphery and plugged once all the liquid crystal material has been inserted into the void or cavity 34. Such techniques and manufacturing procedures are well known to those skilled in the art and are incorporated herein by reference. Moreover, it is to be understood that the protective member according to the present invention is applicable to multiple and varied manufacturing procedures for such display devices, the present described embodiment used for exemplary purposes only.

The rear glass member 16 often includes a heater element 38 which is applied as an indium tin oxide (ITO) layer or as part of a separate glass member and coupled to heater electronics 40 when the display device is used in cold environments such as in aircraft or outer space. Additionally, dependent upon whether or not a back light 42 is provided with the display system, the rear glass member 16 may further include a transflector 44 which allows ambient light from the first light source 20 to be reflected back toward the user as indicated generally by arrow 46.

The present invention features a protective member 50 which, in one embodiment, is disposed between a display pattern or member, such as such a segment pattern 22 or display device 12, and at least a first source of light 20. In the first embodiment, the protective member 50 may be disposed proximate the front region 52 of display device 12. In one implementation of this first embodiment, the protective member 50 may be placed in close proximity to the front glass member 14 and held in the spaced relationship by one or more glass, silicone or other similar spacers 54. In this embodiment, a gap 56 of approximately 14 microns is maintained between the front glass member 14 and a protective member 50. In this embodiment, both surface of protective member 50 may include an anti-reflective coating 18.

The protective member 50 according to the present invention must exhibit certain key characteristics including a sharp ultraviolet (UV) light cut off of 90 percent or more, preferably 95 percent or more, at 400 nanometers, plus or minus 5 nanometers. If the protective member has a cut off lower than 400 nanometers, or the cutoff is not sharp enough, too much ultraviolet light will reach the liquid crystal material disposed in cavity 34 of the display device 12, thus causing color shifts, deterioration, and other problems in the liquid crystal material and cell materials. If the cut off is above 400 nanometers, the protective member will start blocking visible light in the color spectrum that will effect the color presentation of the display device, an unwanted characteristic of a protective member.

An additional essential characteristic of the protective member of the present invention is its ability to transmit approximately 90 percent or more of the visible light above 400 nanometers. Such transmission of visible light should be through "optically clear" glass as defined in terms of chromaticity. One type of ultraviolet light absorbing glass material which is considered partly suitable (with additional modifications to account for its thermal co-efficient of expansion) for the protective member of the present invention is disclosed in U.S. Pat. No. 5,281,562 to Araujo, et al. and assigned to Corning Incorporated, Corning N.Y.

In a second embodiment of the present invention, the protective member 50 may be used as the front glass member 14 in a display member or device 12. In such cases, the front or outward facing protective member 50 will be eliminated and front glass member 14 will be made entirely from the material described in terms of the protective member of the present invention. In such cases, since one or more segment patterns 22 and polyimid alignment layers 26 are provided on the front surface 24 of the front glass member 14, concern must be given to the processing techniques used to fabricate a display device. During the fabrication processes, the display devices are exposed to high temperatures which can cause ions, particularly sodium ions in the glass, to come to the surface of the glass 24. These ions will react with the electrodes 22/28 causing premature and unwanted failures in the display devices.

It is important to note that the protective member of the present invention is fabricated from display worthy glass having properties similar to the properties of currently used display glass such as 7059 fusion glass or standard soda lime glass.

Any glass material used to form the protective member may have to be "passivated" if it is not of a low enough alkalinity and/or if the processing steps utilized in the fabrication of the display devices necessitate the passivation. Passivation may be required to prevent ion migration and to block acids used in the display manufacturing process from eating away at the glass such as may occur if ITO or other thin films are used. One type of glass which the present inventors have studied and identified as being of low enough alkalinity to prevent the leaching out of ions and is display glass quality is a boro-silicate glass.

Additionally, when used in the first embodiment of the present invention that is, when bonded or placed in close proximity to a display member glass front or back member, the protective member of this invention must have a thermal coefficient of expansion (TCE) which is as close as possible to boro-silicate, the standard glass used in the industry or of the actual type of glass being used, so that when various pieces of glass are bonded together, there will be no problems with unmatched coefficients of expansion.

When the protective member of the present invention is used as both the front and back glass of a display member, the TCE of the glass is of lesser concern since both front and back members will react in the same manner to temperature. In a preferred embodiment, the protective member of the present invention has a thermal coefficient of expansion (TCE) of approximately $45 +/-10 \times 10^{-7}/°C$.

Thus, in accordance with the second embodiment of the present invention, the protective member of the present invention may be used directly as the front glass member 14. In the second embodiment, the front glass member 14 comprised of a material in accordance with the protective member of a present invention will be provided in sheet form of approximately 36 mils thick. When used in accordance with the first embodiment, wherein the protective member 50 is bonded directly to or in close proximity with a standard front glass member 14, the protective member need only be approximately 20 mils thick.

In this first embodiment, protective member 50 may be bonded directly to front glass member 14. In this embodiment, there is no gap 56 between protective member 50 and front glass member 14. Further, in this embodiment, anti-reflective coatings 18b and 18c may be eliminated in favor of one anti-reflective coating 18a.

In a third embodiment, particularly in those embodiments wherein a display system uses a back light 42 which allows the display devices to be used in nighttime conditions, without ambient light, the display device further includes a back or rear protective member 50b. Since back light 42 is a source of visible light, including both ultraviolet and non-ultraviolet spectrum components, it may be desirable to include protective member 50b disposed between the back light source 42 and the display device 12, in order to prevent ultraviolet from reaching the back of the display device 12. In this embodiment, as in the first embodiment described herein, the protective member 50b may be bonded directly to rear glass member 16, or held in spaced relationship to rear glass member 16.

In yet another embodiment, much like the second embodiment, the material of protective member 50 having the characteristics described in the present invention may be used to directly form the rear glass member 16. In this embodiment, the protective member 50, approximately 20 mills thick or thicker, is used to form the back or rear glass member 16, and is processed identically to the standard glass member.

The protective member of the present invention may also be chemically tempered, or heat tempered, to further protect against breakage. As previously mentioned in accordance with the problems in the prior art, it has been discovered by the inventors of the present invention that in many applications, direct impact shock can cause failures in the display devices. In such cases, particularly the front glass member 14 must be able to withstand shock both in avoiding shattering and in being able to deflect the impact and vibrational shock away from the display device. Various techniques such as ion exchange or other techniques which are well known in the art may be used to chemically and/or heat temper the protective member.

Accordingly, the protective member of the present invention provides a long sought after solution to the effects of ultraviolet light on display devices. The protective member of the present invention eliminates essentially all harmful ultraviolet radiation from striking a display device or member, while being nearly optically clear, allowing all visible light to strike the display device. In addition, by being able to fabricate a display device using the protective member of the present invention as the actual front and rear glass members of a display device, not only is the fabrication process simplified and reduced but also, the display device protected along with any seals and seal plugs along the periphery of the display device, thus protecting both the LCD material and dye as well as the LCD material seal and plug. Such a protective member can be easily and cost effectively implemented into current manufacturing processes and steps without additional manufacturing steps and costs.

Modifications and substitutions by one of ordinary skill in the art are considered to be within the scope of the present invention which is not to be limited except by the claims which follow.

What is claimed is:

1. A protective member for a display member in a display system, comprising:

a protective member disposed proximate a display member, between said display member and at least a first source of light energy, said light energy including ultraviolet light energy and visible light energy, said protective member blocking generally at least 99 percent of said ultraviolet light energy having a light energy wavelength of less than 400 +/−10 nanometers, and transmitting at least 80 percent of said visible light energy having a light energy wavelength greater than 410 +/−10 nanometers, and transmitting at least 90 percent of said visible light energy having a light energy wavelength greater than 420 +/−10 nanometers; and said protective member having a thermal coefficient of expansion of between $40 \times 10^{-7}/°$ C. and $60 \times 10^{-7}/°$ C.

2. The protective member of claim 1, wherein said protective member at least conforms to military specification MIL 85762A as to fluorescence.

3. The protective member of claim 1, wherein said light source is disposed in front of said display member.

4. The protective member of claim 1, wherein said light source is disposed behind said display member.

5. The protective member of claim 4 further including a heating member disposed proximate said light source disposed behind said display member.

6. The protective member of claim 1, wherein said display member includes front and back members.

7. The protective member of claim 6, wherein said protective member is bonded to said front member of said display member.

8. The protective member of claim 6, wherein said protective member is bonded to said back member of said display member.

9. The protective member of claim 8, further including at least one heating element proximate said back member.

10. The protective member of claim 6, wherein said protective member is said front member of said display member.

11. The protective member of claim 6, wherein said protective member is said back member of said display member.

12. The protective member of claim 6, wherein said protective member is mounted proximate said front member of said display member.

13. The protective member of claim 6, wherein said protective member is mounted proximate said back member of said display member.

14. The protective member of claim 1, wherein said display member includes an electronically activated display device.

15. The protective member of claim 14, wherein said electronically activated display device includes a liquid crystal display.

16. The protective member of claim 15, wherein said liquid crystal display device includes an active matrix liquid crystal display device.

17. The protective member of claim 14, wherein said electronically activated display device includes a twisted nematic display.

18. The protective member of claim 14, wherein said electronically activated display device includes a dichroic LCD display device.

19. The protective member of claim 1, wherein said protective member is shock resistant.

20. The protective member of claim 19, wherein said protective member is resistant to impact shock.

21. The protective member of claim 19, wherein said protective member is resistant to thermal shock.

* * * * *

UNITED STATES PATENT AND TRADEMARK OFFICE
CERTIFICATE OF CORRECTION

PATENT NO. : 5,539,552
DATED : July 23, 1996
INVENTOR(S) : Desai, et. al.

It is certified that error appears in the above-indentified patent and that said Letters Patent is hereby corrected as shown below:

Title page, item [54] and col. 1, line 2, in the Title , should read--
99 PERCENT UV LIGHT--.

Signed and Sealed this

Seventeenth Day of December, 1996

Attest:

BRUCE LEHMAN

Attesting Officer     Commissioner of Patents and Trademarks